US008708397B2

United States Patent
Daylong

(10) Patent No.: US 8,708,397 B2
(45) Date of Patent: Apr. 29, 2014

(54) TOOL TOP-PICKUP TRUCK BED LOW PROFILE TOOL BOX WITH SLIDING LIDS

(76) Inventor: Patrick Lynn Daylong, Lockhart, TX (US)

( * ) Notice: Subject to any disclaimer, the term of this patent is extended or adjusted under 35 U.S.C. 154(b) by 198 days.

(21) Appl. No.: 13/507,185

(22) Filed: Jan. 3, 2012

(65) Prior Publication Data

US 2012/0292939 A1    Nov. 22, 2012

Related U.S. Application Data

(63) Continuation-in-part of application No. 12/590,833, filed on Nov. 16, 2009, now abandoned.

(51) Int. Cl.
*B60J 7/00* (2006.01)
(52) U.S. Cl.
USPC .............................. 296/164; 296/10; 296/37.6
(58) Field of Classification Search
USPC ................ 296/10, 37.6, 164, 100.02, 100.06, 296/100.1, 100.01, 100.07, 100.09
See application file for complete search history.

(56) References Cited

U.S. PATENT DOCUMENTS

| D250,012 | S | * | 10/1978 | Windecker et al. | ........... D12/404 |
| 4,199,188 | A | * | 4/1980 | Albrecht et al. | ......... 296/100.04 |
| D276,326 | S | * | 11/1984 | Bell, Jr. | ........................ D12/96 |
| 5,102,180 | A | * | 4/1992 | Finley | .......................... 296/37.6 |
| 5,316,358 | A | * | 5/1994 | Payne et al. | .................. 296/37.6 |
| 5,667,268 | A | * | 9/1997 | Bump | .......................... 296/37.6 |
| 6,176,540 | B1 | * | 1/2001 | Whittaker | ............... 296/100.02 |
| 6,325,439 | B1 | * | 12/2001 | Crossman | .................... 296/37.6 |
| 6,588,819 | B1 | * | 7/2003 | Block | ........................ 296/26.04 |
| 7,052,067 | B2 | * | 5/2006 | Walker | ......................... 296/37.6 |
| D566,646 | S | * | 4/2008 | Whittaker | ................ D12/414.1 |
| 7,686,365 | B2 | * | 3/2010 | Thelen et al. | ................ 296/37.6 |

* cited by examiner

*Primary Examiner* — Joseph Pape

(57) ABSTRACT

A pickup truck bed low profile tool box with sliding lids mounted across the pickup truck bed inside a protective fastback style rigid shell, resting on the cargo bed rails, with gull wing doors on either side of the shell, over the low profile tool box behind the pickup truck cab, pivot up out of the way for easy access to the low profile tool box and a fastback rear hatch door that opens wide affording easy access to the tool box from inside the cargo bay.

1 Claim, 17 Drawing Sheets

Tool Top - pickup truck bed low profile tool box with sliding lids

Tool Top - pickup truck bed low profile tool box with sliding lids

Tool Top - pickup truck bed low profile tool box with sliding lids

Tool Top - pickup truck bed low profile tool box with sliding lids

Tool Top - pickup truck bed low profile tool box with sliding lids

Tool Top - pickup truck bed low profile tool box with sliding lids

Tool Top - pickup truck bed low profile tool box with sliding lids

Tool Top - pickup truck bed low profile tool box with sliding lids

Tool Top - pickup truck bed low profile tool box with sliding lids

Tool Top - pickup truck bed low profile tool box with sliding lids

Tool Top - pickup truck bed low profile tool box with sliding lids

Tool Top - pickup truck bed low profile tool box with sliding lids

Tool Top - pickup truck bed low profile tool box with sliding lids

Tool Top - pickup truck bed low profile tool box with sliding lids

Tool Top - pickup truck bed low profile tool box with sliding lids

Tool Top - pickup truck bed low profile tool box with sliding lids

Tool Top - pickup truck bed low profile tool box with sliding lids

TOOL TOP-PICKUP TRUCK BED LOW PROFILE TOOL BOX WITH SLIDING LIDS

This application is a continuation in part of application Ser. No. 12/590,833 filed Nov. 16, 2009 now abandoned.

BACKGROUND OF THE INVENTION

1. Technical Field

The present invention relates to a pickup truck bed low profile tool box with sliding lids mounted across the pickup truck bed just behind the pickup truck cab at the front of the pickup's bed inside a protective ridged shell with a removable fastback hatch door.

A pickup truck's cargo bay is important as a useful area to transport and store tools, parts and material; however, a pickup truck user does not always need the whole cargo area to store tools and parts. Therefore, a smaller storage and transport area in the form of a low profile tool box with sliding lids mounted across the pickup truck bed inside a rigid shell is very useful and gives the user more options.

Because conventional pickup truck bed tool boxes that are mounted across the pickup bed are not compatible with rigid pickup bed shell designs it has been necessary for the working person to choose between a rigid pickup truck bed shell that covers the whole pickup bed or a tool box across the pickup bed. Both the tool box across the pickup truck bed and the full bed rigid shell are useful for different reasons and uses.

Tool boxes mounted across the pickup truck bed near the cab are useful for several reasons: to protect tools in the pickup bed from weather or theft, and keep tools segregated from other items that might be in the cargo area.

Popular types of rigid pickup truck bed shells extend at least to the top of the pickup truck's cab, mount flush with the pickup truck bed side rails and have a rear door to access the items in the cargo area. There are many styles and configurations of rigid pickup truck bed shells that are designed for specific or general purpose use.

These conventional rigid pickup truck bed shells are incompatible with existing tool boxes that mount across the pickup bed because the tool boxes extend into the mounting area needed by the rigid shells and the tool box would not be accessible if a rigid shell could be mounted over the tool box.

2. Background Art

An example is disclosed in U.S. patent Ser. No. 05/832,512 issued Oct. 34, 1978 to Windecker et al. titled "Fast-back cover for the bed of a pickup truck" Windecker discloses a fastback style rigid pickup truck bed shell in which the whole rear two thirds of the shell has to be lifted to access the cargo bay of the pickup truck. The Wendecker pickup truck shell cannot accommodate a tool box across the pickup truck bed under the shell and the shell does not have a rear hatch door for convenient access to the cargo bay and the tool box from inside the cargo area. The rear area of the Windecker may be removable for hauling tall loads but it is uncertain.

Another example is described in U.S. Pat. No. 6,325,439 B1 issued December 2001 to Scott P. Crossman titled "Handling Storage Unit for a truck cargo bay". Crossman discloses a hanging storage unit that hangs below a low profile pickup truck bed cover. However the Crossman invention is not designed to fit a common rigid pickup truck shell that is raised above the bed. The Crossman storage unit is not accessible when the low profile cover is closed or if the storage unit is near the front.

Another example is described in U.S. Pat. No. 4,199,188 issued Apr. 22, 1980 to Albrecht titled "Vehicle Accessory System". Albrecht discloses a tool box 140 mounted across the pickup truck bed supported above the cargo area floor by sections of the tool box resting on the side rails of the pickup truck side rails. The tool box incorporates centered hinged covers, allowing access to the tool box from either side. However, there is a disadvantage with the Albrecht tool box unit; it extends above the pickup truck bed side rails preventing the user to have the added utility of a rigid shell over the whole pickup bed.

Another example is disclosed in U.S. patent Ser. No. 06/320,195 issued Nov. 13, 1984 to George G. Bell Jr. titled "Load Body" Bell discloses a load body that can replace the pickup truck bed. The load body has a type of gull wing doors but the load body does not have an internal tool box nor does it have an easy and convenient way to haul over sized items.

Another example is described in U.S. Pat. No. 5,102,180 issued Apr. 7, 1992 to Jerry D. Finley titled "Vehicle cover with sideways accessible storage container". Finley discloses a Vehicle cover with a storage container across the vehicle and accessible through simple doors. However this unit does not have gull wing doors or a fastback rear hatch door and it cannot haul tall cargo with the cover in place.

Another example is described in U.S. Pat. No. 6,588,819 issued Jul. 8, 2003 to David C. Block titled "Truck Shell". Block discloses a truck shell with side panels that open up but are not true gull wing door and Block does not have a fastback style nor removable rear hatch door. Block cannot accommodate a tool box across the pickup truck bed.

Another example is described in U.S. Pat. No. 7,052,067 issued May 30, 2006 to Eric L. Walker titled "Combination bed-liner and toolbox for pick-up truck". Walker discloses a pickup truck accessory combining side mounted tool boxes and a bed liner. The tool box lids open upwardly in a clam shell configuration more than as gull wing doors and has no full coverage of the pickup truck cargo bay.

Another example is described in U.S. Pat. No. D566,646 S issued Apr. 15, 2008 to John Whittaker titled "Universal tool carrier". Whittaker discloses a tool carrier that can be hauled in a pickup truck cargo area and has both upward opening as well as downward opening doors. Whittaker is remotely related to pickup truck shells.

Another example is described in U.S. Pat. No. 5,667,268 issued Sep. 16, 1997 to Durwin L. Bump titled "Protective door for service compartment". Bump discloses a protective door system that opens upward. This patent is issued for the way the doors seal.

SUMMARY OF THE INVENTION

The problems mentioned are solved in the present invention in that the Tool Top pickup bed low profile tool box with sliding lids invention is designed to be incorporated into a fully enclosed protective ridge shell with a fastback hatch door, with access to the low profile tool box through gull wind doors over the tool box on either side of the pickup bed. The Tool Top's low profile tool box with sliding lids is designed with a low profile opening where it rests on the pickup truck cargo bay rails so that removing heavy tools and other items that might be stored in the tool box are more easily accessible to the user. The Tool Top's low profile tool box with sliding lids has a durable steel lip, where it rests on the pickup truck bed rails, to protect the rigid shell and the pickup bed rails when heavy items are slid over the rail into the tool box and the mounting pad is reinforced on both sides.

For ease of access the Tool Top pickup truck bed low profile tool box with sliding lids invention is designed to mount inside a ridge shell with locking gull wing doors over the ends of the tool box on either side of the pickup bed shell. The gull wing doors lift up and out of the way so that the user can reach into the tool box to get the items that they need. The gull wing doors can be made of several different materials but glass or acrylic materials afford the best visibility for the pickup truck driver.

Because many people will, from time to time, need the availability of the whole cargo floor to haul large objects such as long lumber and further need to haul tall objects such as refrigerators without the inconvenience of removing the entire shell the Tool Top pickup truck bed low profile tool box invention mounts some distance above the cargo bay floor and further the associated ridge shell is designed with a fastback rear hatch door that is easily removable. The fastback hatch door is designed with hinges that pivot on removable pins so that the rear fastback hatch door can be removed by removing two pins and one end of the two lift struts that hold the hatch door in the open position. With the hatch door off, two thirds of the cargo area is available to haul tall items that would not fit in the tallest of other rigid pickup bed shells. Other pickup bed shells must be removed to get the same use from the pickup truck's cargo area. The rear hatch door opens very wide to allow much easier access to items stored in the bed.

With the rear hatch door attached the cargo bay can be loaded with a full load and the hatch door secured to the load in the horizontal or partly open position and still afford a more aerodynamic profile.

The Tool Tops associated pickup bed shell design has an aerodynamic fastback profile that improves fuel mileage by more than 15%. In the final analysis the Tool Top invention is a unique and innovative design that breaks new ground when it comes to convenience and versatility.

DETAILED DESCRIPTION OF THE PREFERRED EMBODIMENT

Figure 3:
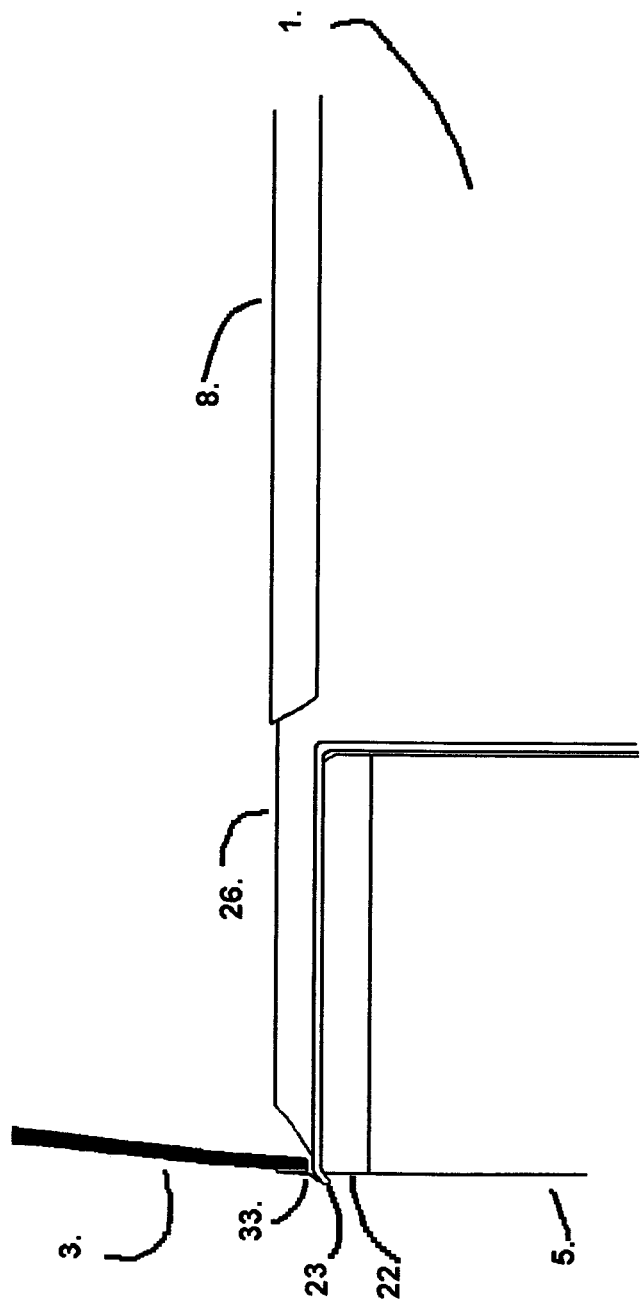
FIG. 3 is a measured close up view of the left side of the low profile tool box with sliding lids from the rear showing the support lip and reinforcement.
Figure 12:
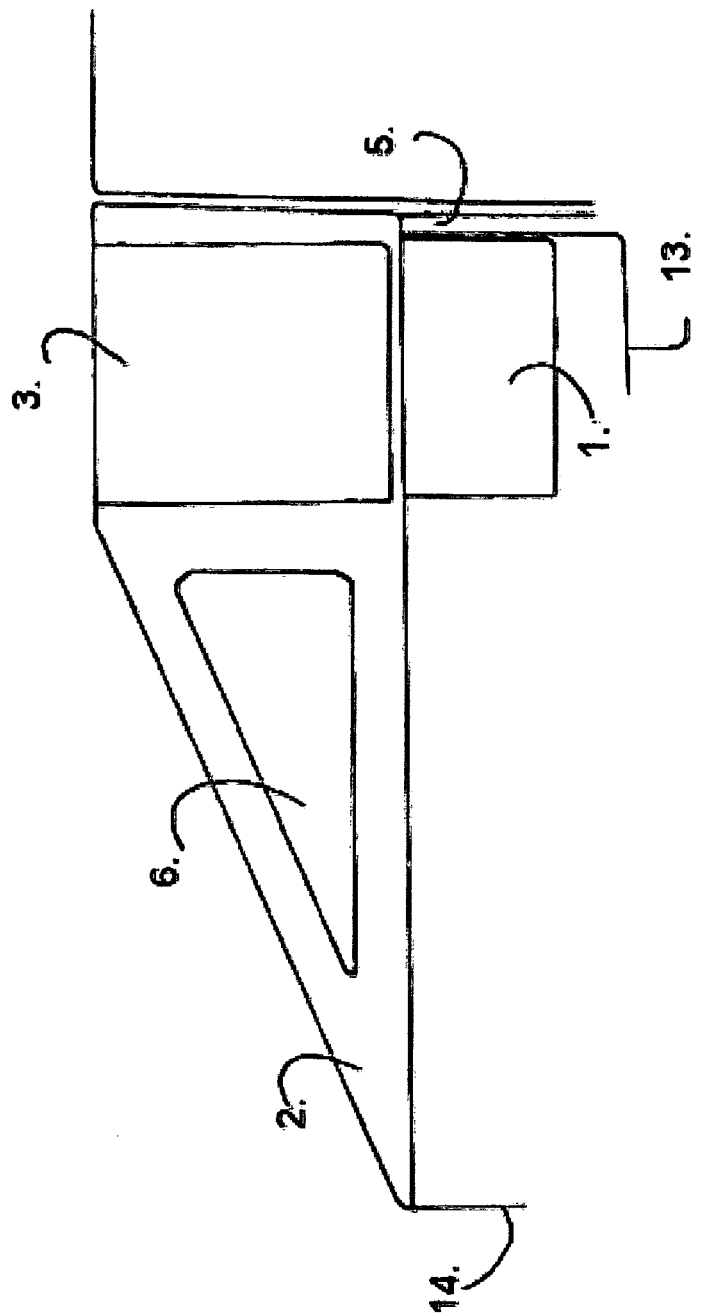
FIG. 12. is a right side view of the Tool Top low profile tool box with sliding lids mounted in the protective ridge shell.
Figure 13:
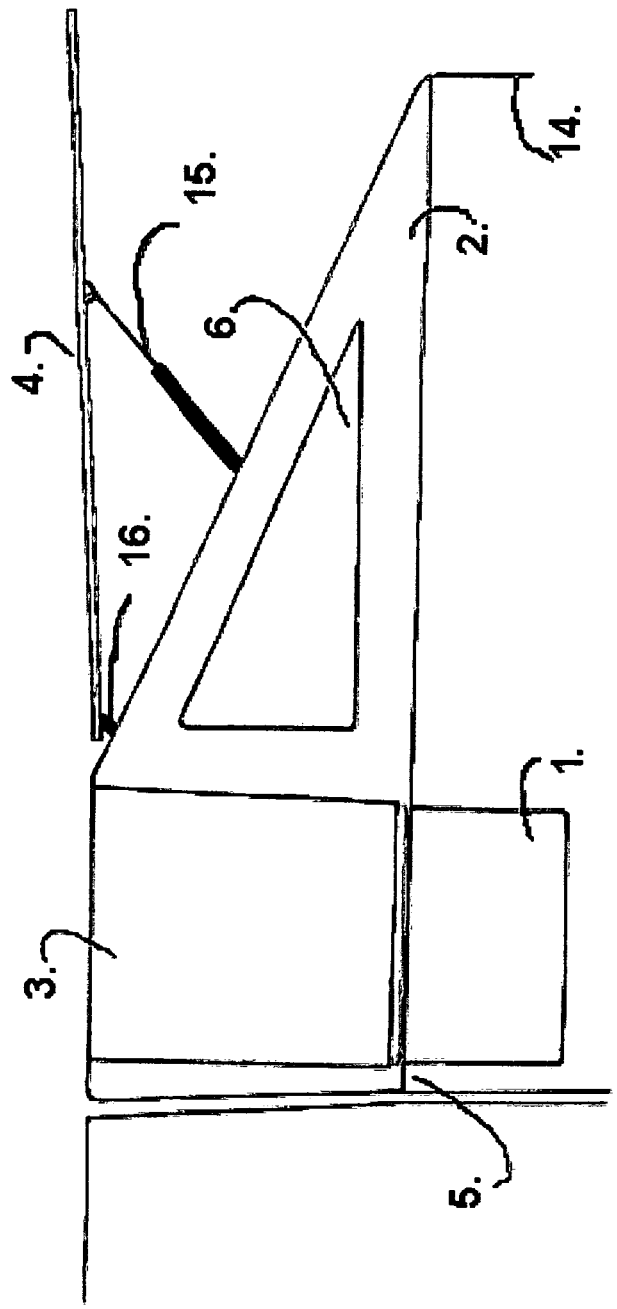
FIG. 13. is a left side view thereof.
Figure 14:
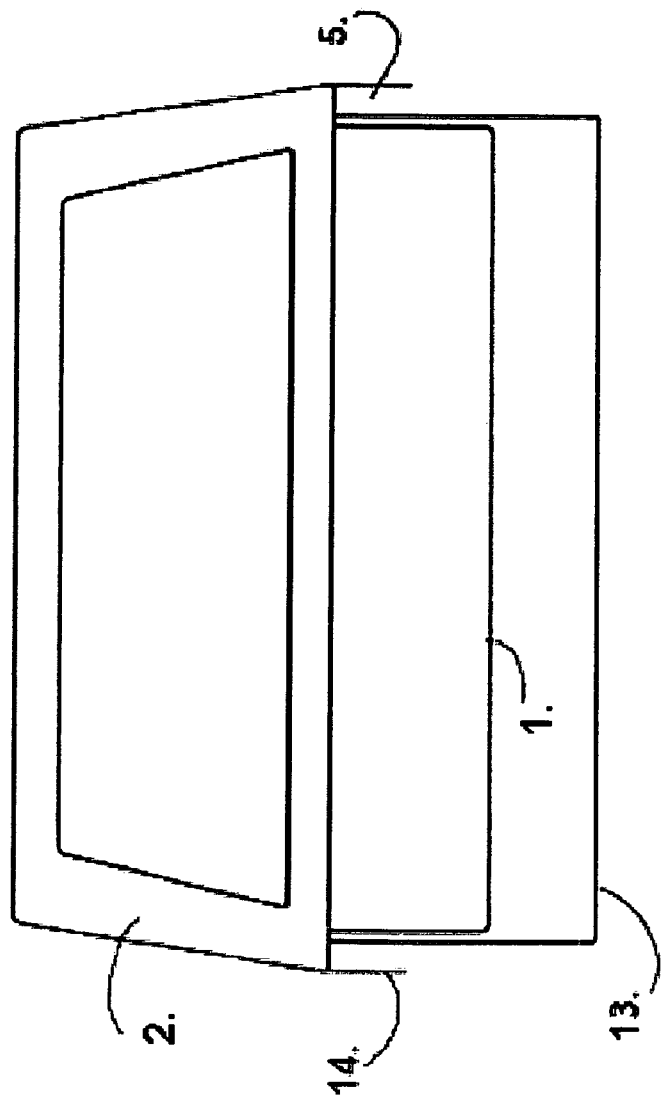
FIG. 14. is a rear view thereof.
Figure 15:
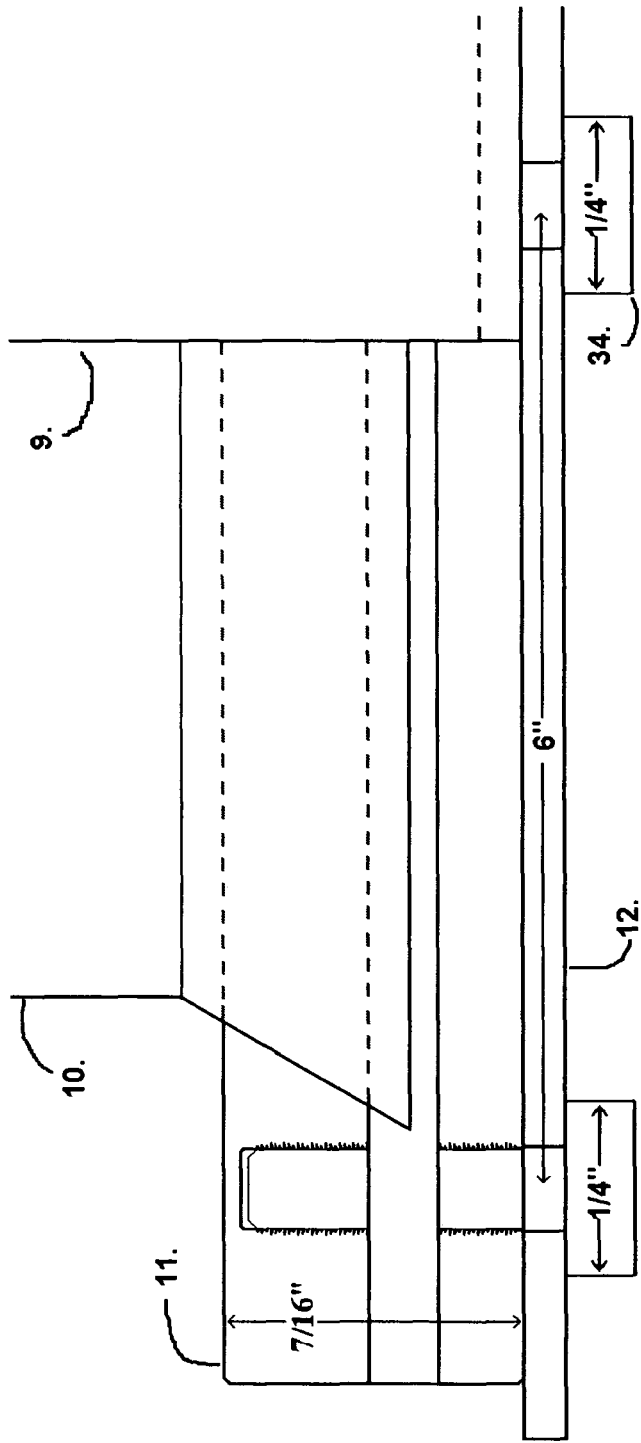
FIG. 15. is a cut away view from above of the draw and lower lid support rail.

The tool top pickup bed low profile tool box with sliding lids 1 of the present invention is installed on a pickup truck bed 14, attached to the side rails 5 of the pickup truck bed 14 (FIGS. 3 & 12). The tool top pickup truck bed low profile tool box with sliding lids 1 includes a protective ridged shell 2 mounted on the pickup truck bed that resting on the pickup truck bed side rails 5 with the bottom of the tool box 1 above the cargo bed floor 13 (FIG. 12).

Figure 4:
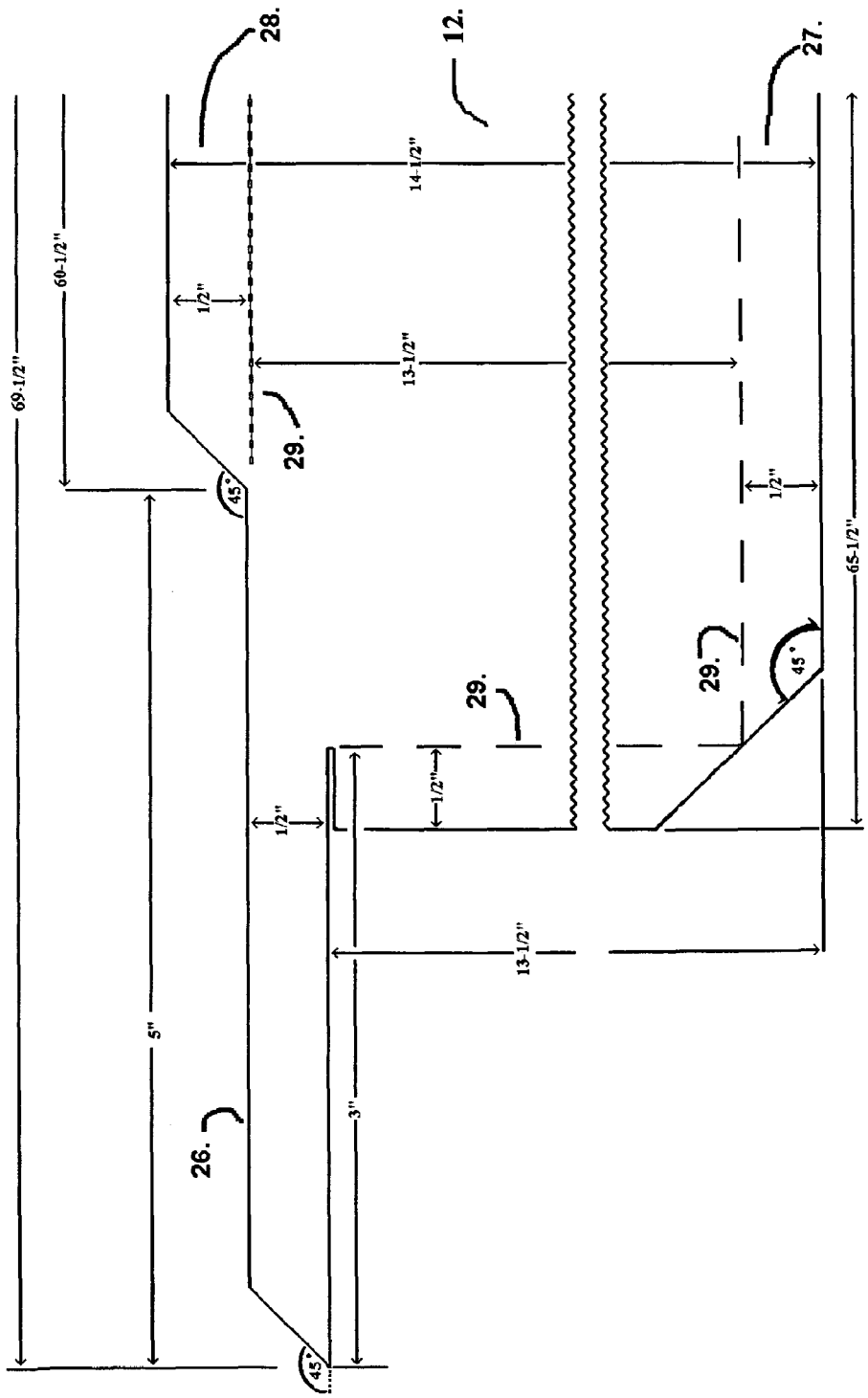
FIG. 4 is an expanded and measured view of the end area of the side panels of the tool box before bending.
Figure 5:
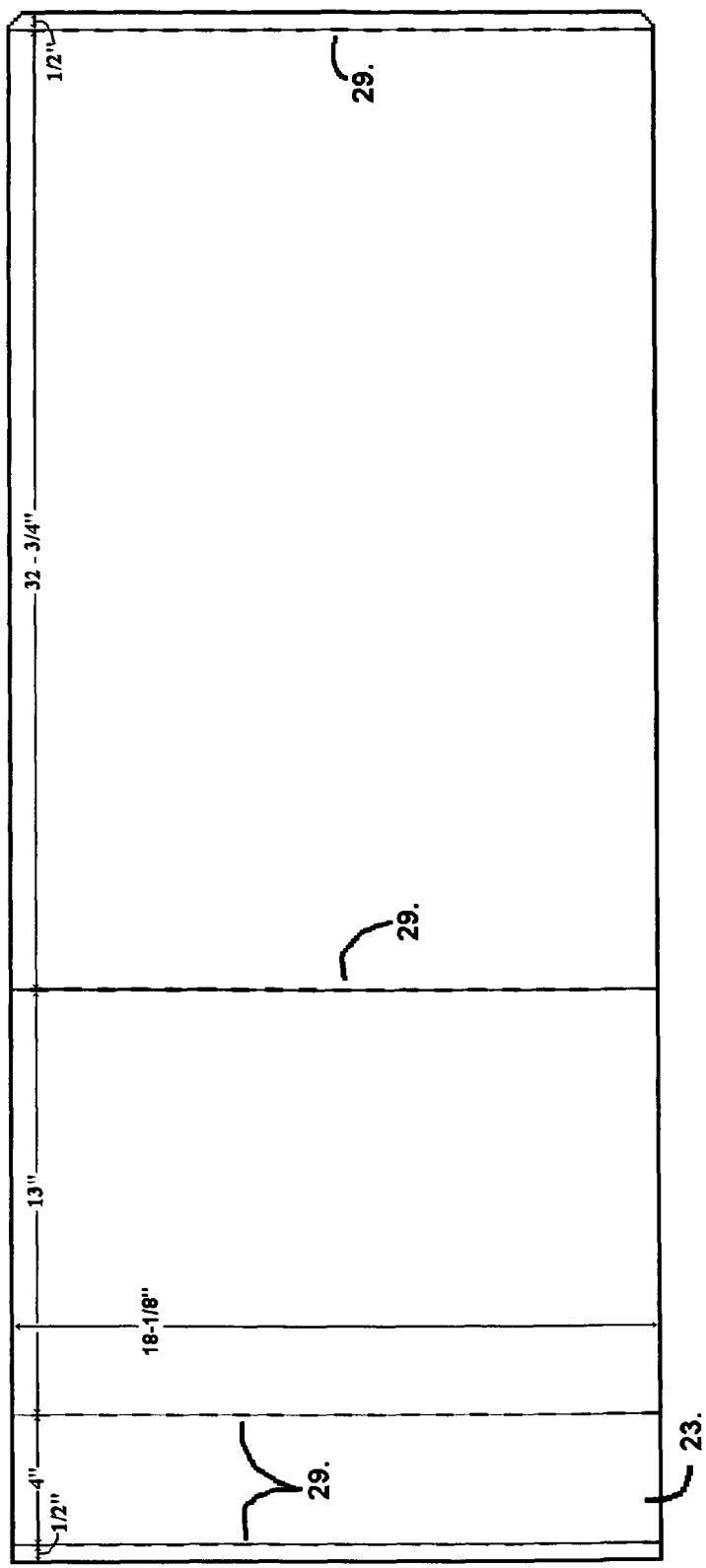
FIG. 5 is a measured view of the Tool Top low profile tool box bottom and end panels before bending.
Figure 6:
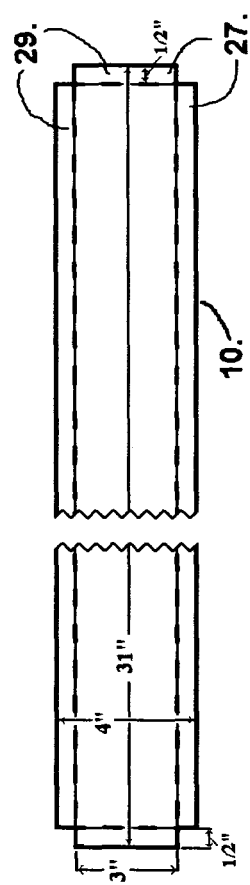
FIG. 6 is a measured view of the side panel of the sliding drawer inside the tool box.
Figure 7:
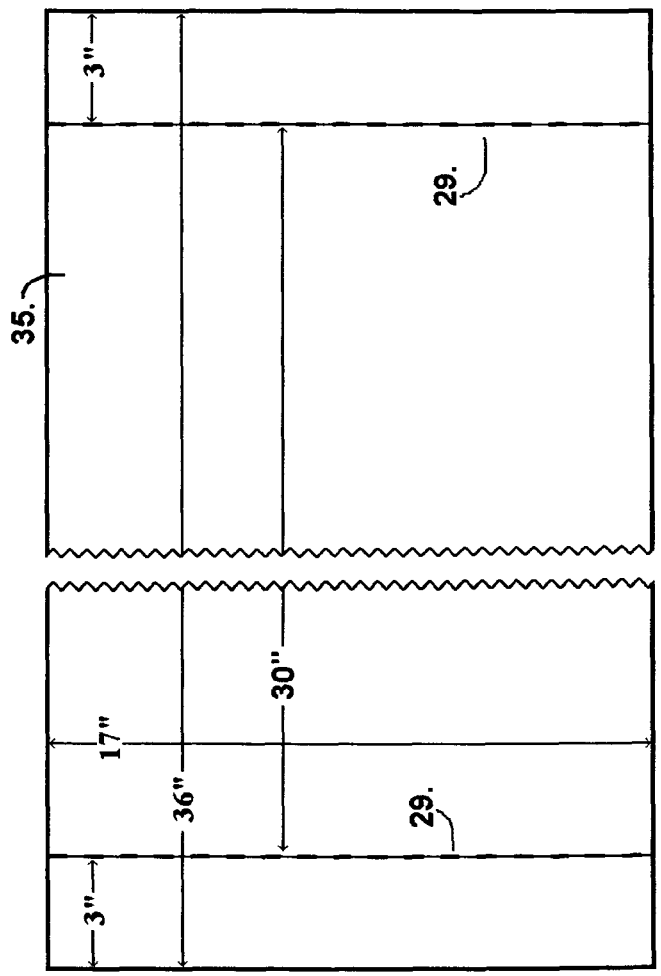
FIG. 7 is a measured view of the panel for the sliding drawer bottom and ends.
Figure 10:
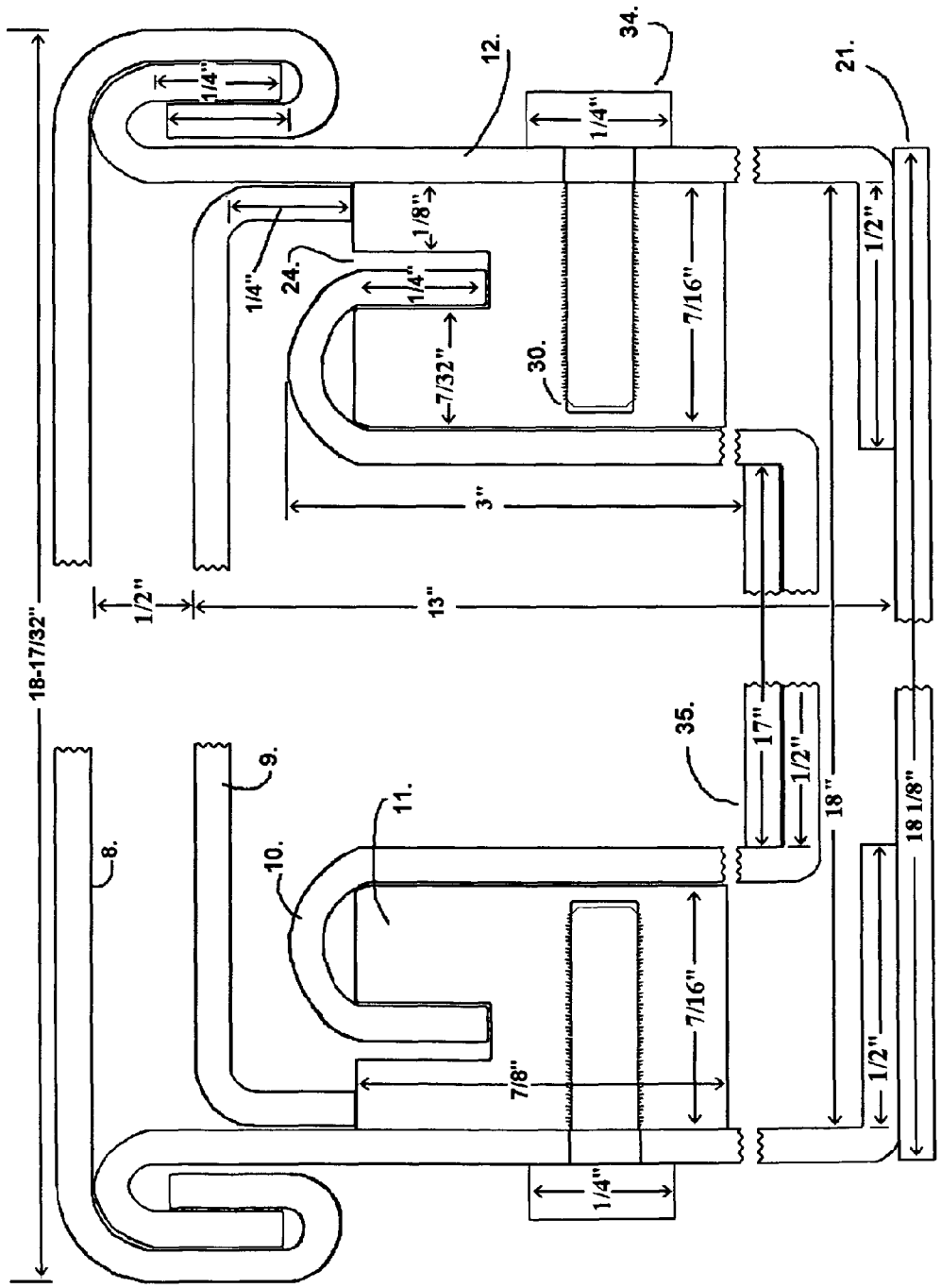
FIG. 10. is a measured cross section of the low profile tool box with sliding lids.

The tool box 1 includes the main body 7, composed of two side panels 12 (FIGS. 2, 3 & 4) and two panels shown in (FIG. 5) that make up the bottom, the ends and the support lips 23; an upper sliding lid 8, a lower sliding lid 9, a sliding drawer 10 and a drawer/lid support 11 (FIG. 10).

Figure 2:
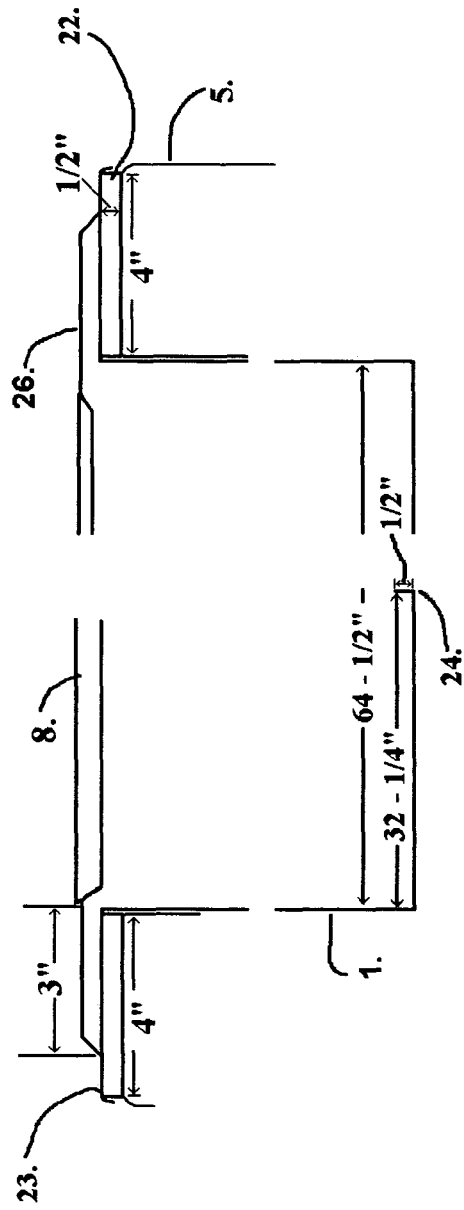
FIG. 2 is a measured and cut view from the rear.
Figure 8:
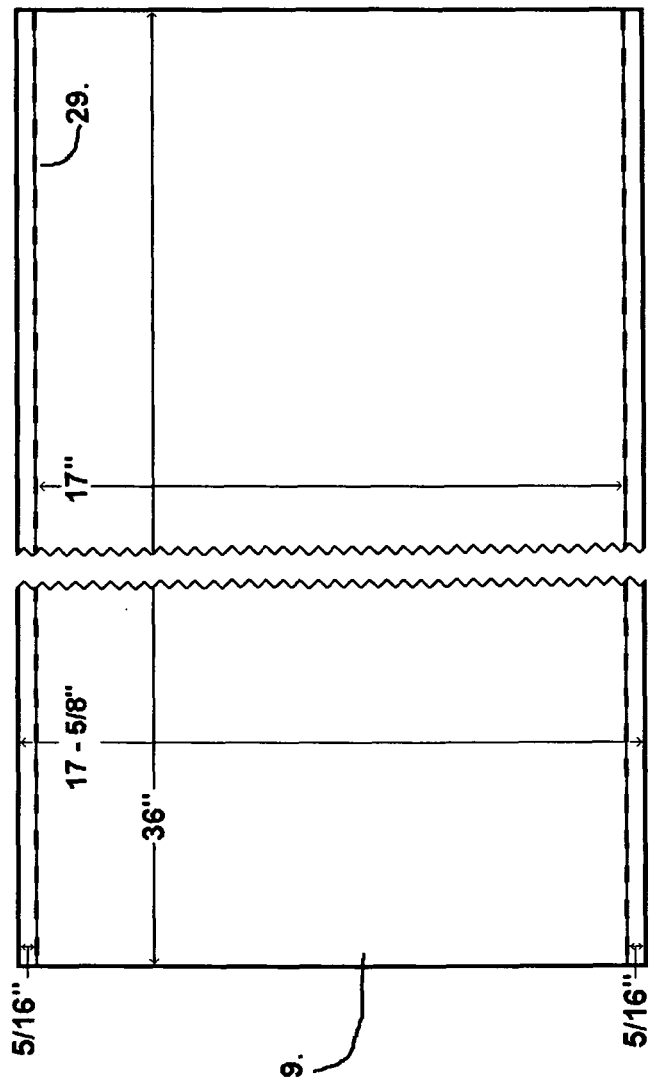
FIG. 8. is a measured view of the lower sliding lid.
Figure 9:
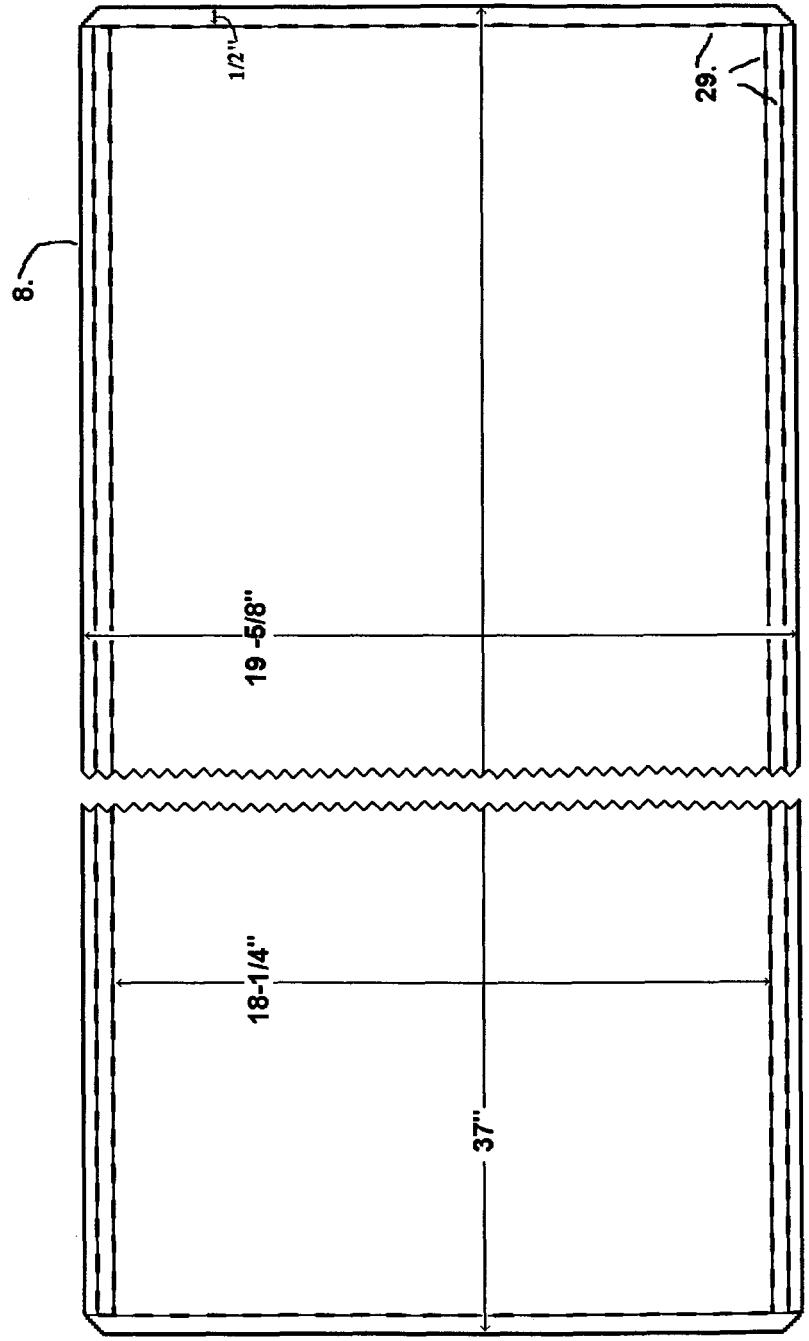
FIG. 9. is a measured view of the upper sliding lid.

The tool box main body 7 is formed from sheet metal that is cut bent and welded together at the bend lines 29 (FIGS. 4, 5, 6 & 10). The bottom of the Tool Top low profile tool box 1 is made from two identical panels (FIGS. 8 & 2) that are each bent to form half of the bottom, the ends, the support lips 23 and a ridge 24 (FIG. 2) in the bottom of the box that stiffens and strengthens the bottom at the center (FIG. 2). The top of the side panels 12 curl from the inside out 180 degrees to form lips that secure and guide the upper lid 8 (FIG. 10). The upper lid 8 is cut to size and the side edges are bent 90 degrees and then 180 degrees to allow the upper lid 8 to couple with the main body side panels locking the upper lid to the side panels. The lower lid 9 is cut to size and bent along the long edges at the bend lines at 90 degrees so that it can slide along the support rail 11.

Figure 1:
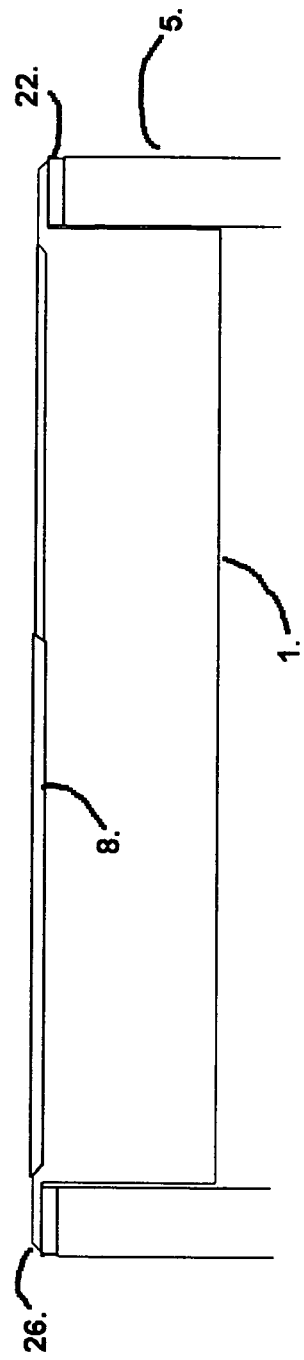
FIG. 1 is a rear view of the Tool Top pickup bed low profile tool box with sliding lids mounted across the pickup truck bed.

The sliding drawer 10 and the lower lid 9 are supported by a slotted rail 11 bolted along the inside length of the tool box's side walls 12 near the top (FIG. 10) attached with eleven 5/16" bolts each. (FIG. 10, 15, 17). The lower lid 9 is able to slide from one end of the tool box to the other, underneath the upper lid 8 which is also able to slide from end to end. The side panels 12 (FIG. 3) extend over the support lip 23 (FIG. 2) at the ends to reinforce 26 the support lips 23 where they rest on the tool box support pads 22 built into the protective shell where it rests on the pickup truck bed side rails 5 (FIGS. 1 & 2).

The gull wing doors 3 seal 33 against the support lip 23 to make the Tool Top low profile tool box weather tight and lock for security. The gull wing doors 3 lift up and out of the way to give easy access to the low profile internal tool box with sliding lids 1 (FIG. 3). The tool box's upper sliding lid 8 slides above the lower sliding lid 9 to allow access to the sliding drawer 10 inside the low profile internal tool box with sliding lids 1 (FIG. 10).

Figure 11:
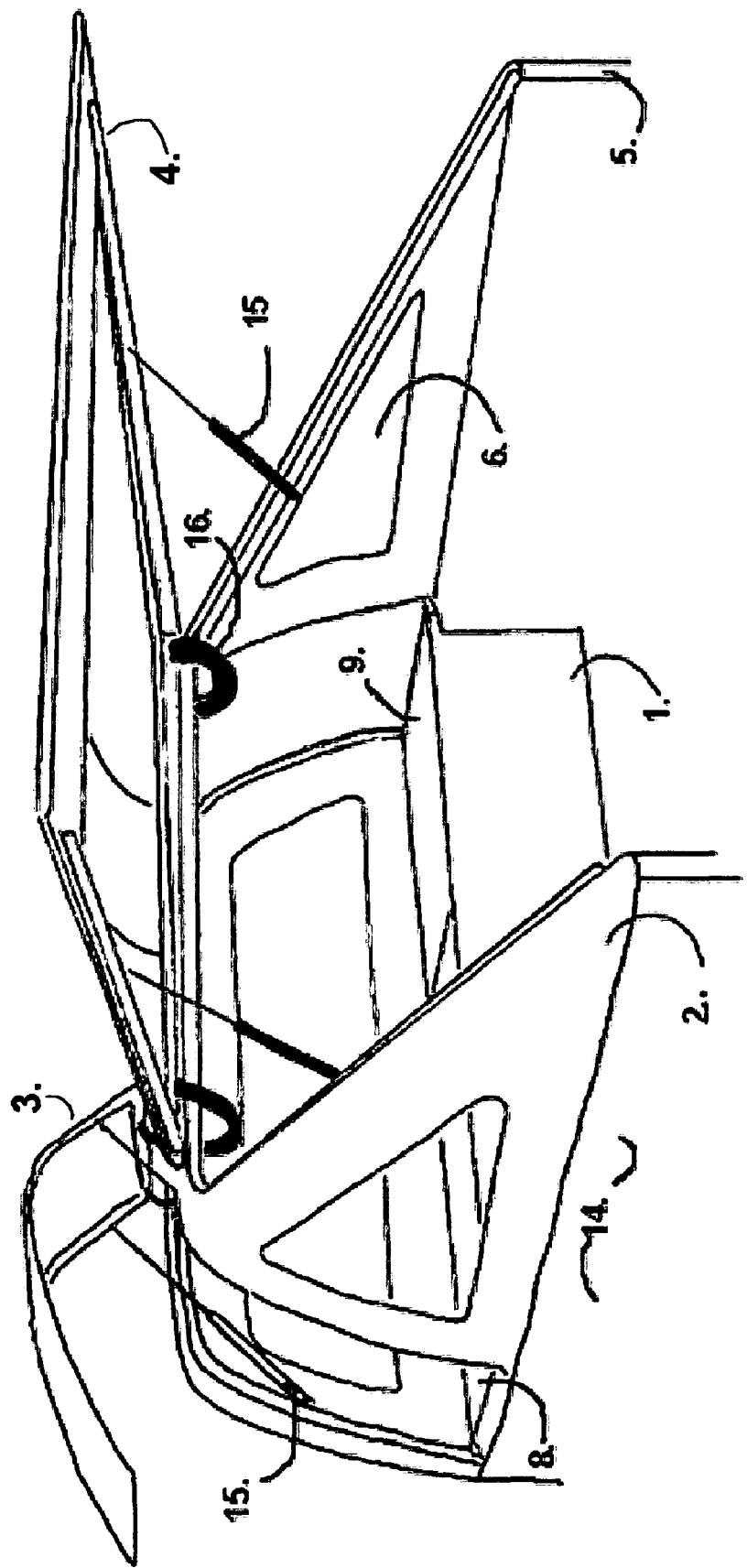
FIG. 11. is a corner view of the tool Top low profile tool box mounted inside the fastback style protective shell.

Access to the tool box from the rear is improved over other pickup truck bed tool boxes by the wide opening fastback rear hatch door 4 (FIG. 11).

Figure 16:
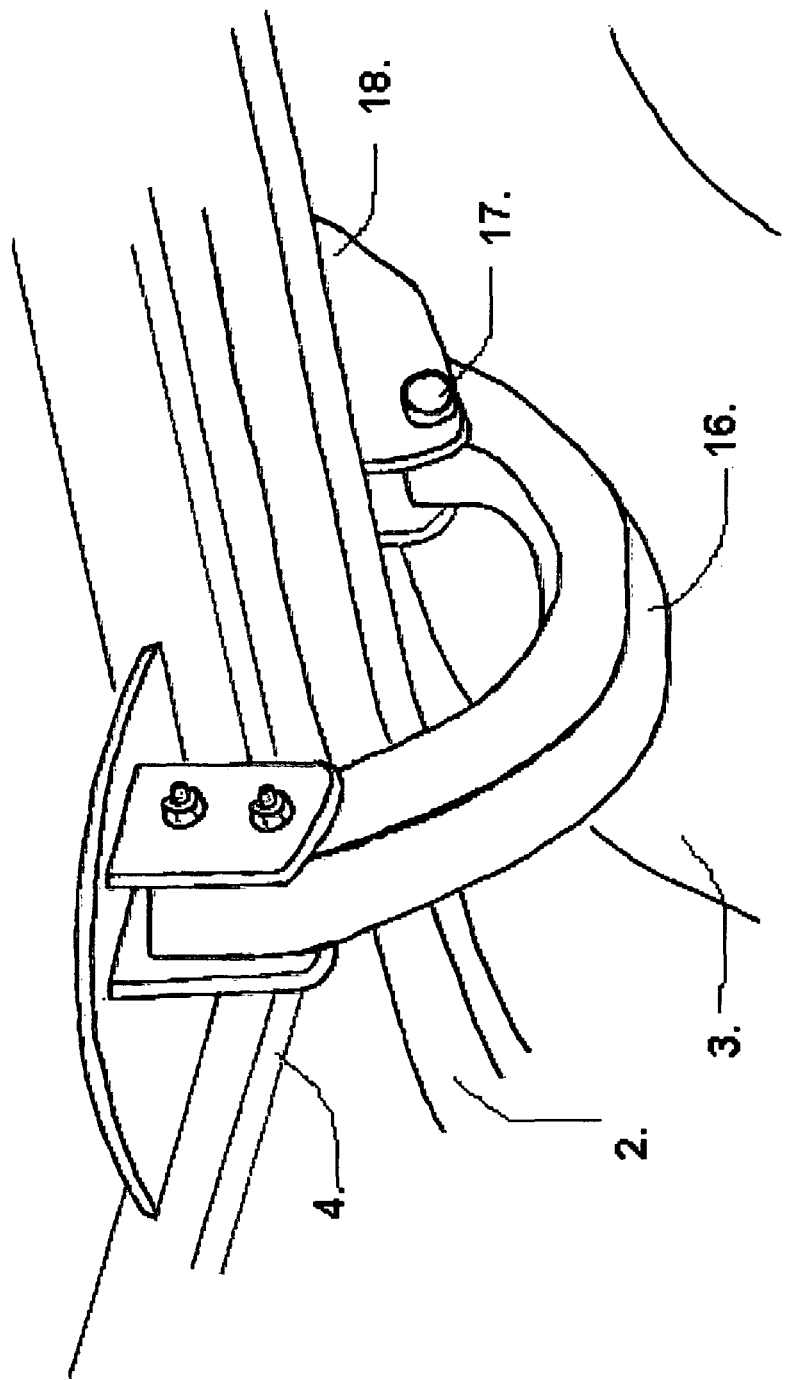
FIG. 16. is a close up view of the removable hatch door pivot pins.
Figure 17:
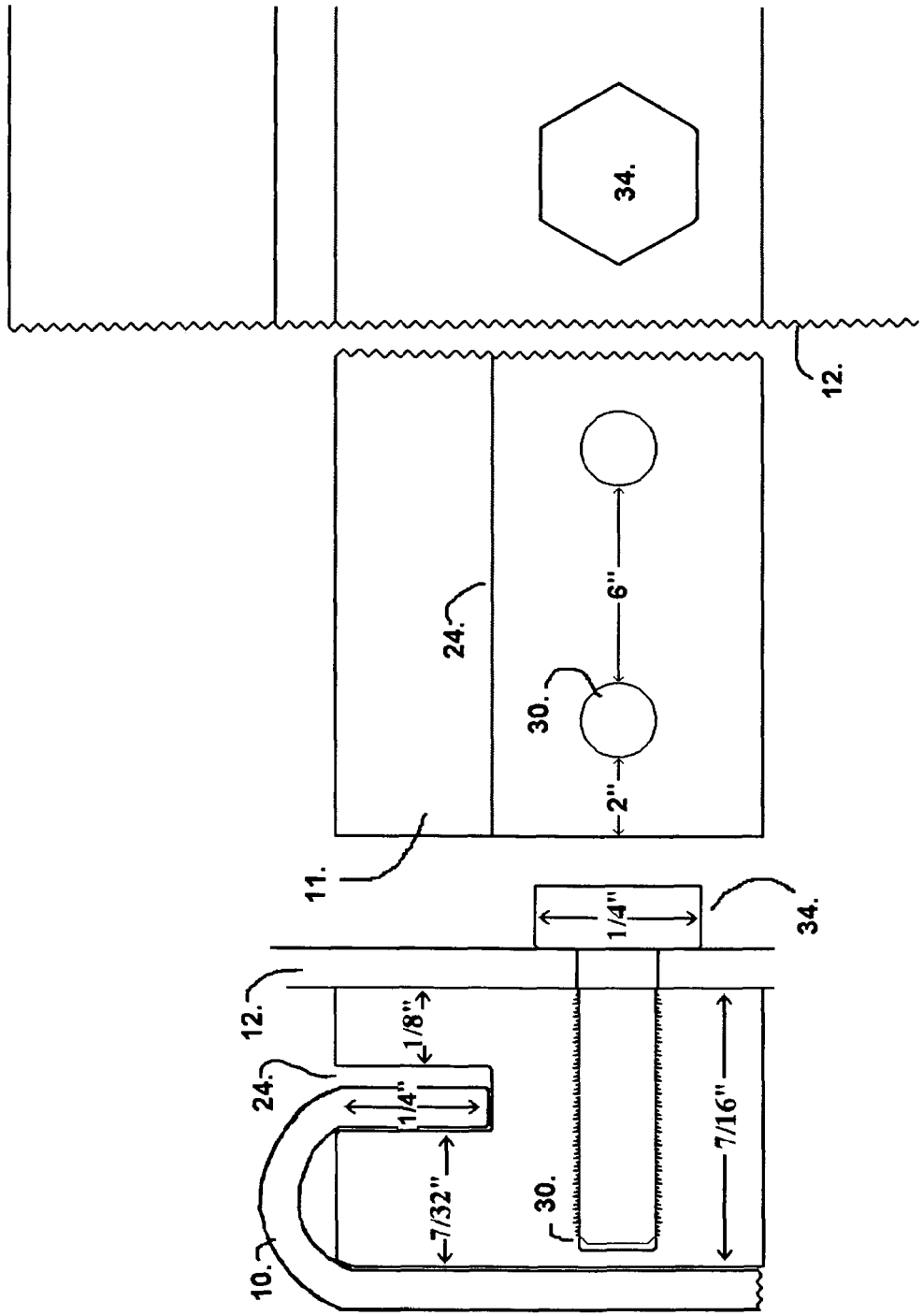
FIG. 17. is a close up and measured view of the end of the lower lid and drawer support rail and a view from the back and front.

By removing the two pivot pins 17 from the pivot supports 18 the fastback rear hatch door can be removed allowing the hinges 16 to be removed with the rear hatch door 4 (FIG. 16). With the fastback rear hatch door 4 removed two thirds of the cargo area is available to haul taller cargo 19 that could not be hauled with other pickup truck bed shells attached to the bed.

The above descriptions are those of preferred embodiments of the invention. Various alterations and changes can be made without departing from the spirit and broader aspects of the invention as defined in the claims, which are to be interpreted in accordance with the principles of patent law, including the doctrine of equivalents. Any reference to an item in the disclosure or to an element in the claim in the singular using the articles "a," "an," "the," or "said" is not to be construed as limiting the item or elements to the singular unless expressly so stated.

The embodiments of the invention in which an exclusive property or privilege is claimed are defined as follows:

1. A pickup truck cover and toolbox assembly comprising:
a protective rigid shell for covering the pickup truck bed including a front wall, a roof, a pair of side walls, a pair of gull wing doors, and a rear hatch; the gull wing doors are pivotally connected to the roof and open upwardly adjacent to the front wall in order to provide access to a cargo area of the truck bed, the rear hatch extends across the rear of the cover, is pivotally connected to the roof, and extends downwardly at an angle from the roof to the top of the side walls of the truck bed in a rearward direction; and
a tool box positioned near a front wall of the truck bed extending in a transverse direction generally between the gull wing doors of the rigid shell, the tool box includes an enclosed area defined by a front wall, a rear wall, end walls, a bottom and an upper sliding lid, the front and rear walls including upper edges which curl from the inside out 180 degrees to form upper lips, the upper sliding lid having side edge which are bent 90 degrees and then 180 degrees to allow the upper sliding lid to couple with the curled upper edges of the front and rear walls in a manner to permit sliding of the upper sliding lid relative to the front and rear walls; the toolbox further comprising a pair of slotted rails which are bolted to inside surfaces of the front and rear walls, the slotted rails support a lower sliding lid and a drawer thereon, both the lower sliding lid and the drawer are slidable along the slotted rail,
wherein the lower sliding lid is positioned below the height of the upper sliding lid and the lower sliding lid selectively covers the drawer; and
wherein the gull wing doors are selectively opened in order to provide access to the toolbox.

* * * * *